United States Patent
Oikawa

(10) Patent No.: US 10,046,796 B2
(45) Date of Patent: Aug. 14, 2018

(54) TRAVELLING APPARATUS, CONTROL METHOD OF TRAVELLING APPARATUS, AND CONTROL PROGRAM OF TRAVELLING APPARATUS

(71) Applicant: TOYOTA JIDOSHA KABUSHIKI KAISHA, Toyota-shi (JP)

(72) Inventor: Susumu Oikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/468,904

(22) Filed: Mar. 24, 2017

(65) Prior Publication Data

US 2017/0313350 A1    Nov. 2, 2017

(30) Foreign Application Priority Data

May 2, 2016   (JP) ................................. 2016-092508

(51) Int. Cl.
| | | |
|---|---|---|
| G01M 17/007 | (2006.01) | |
| B62D 11/00 | (2006.01) | |
| B62D 11/04 | (2006.01) | |
| G05D 1/08 | (2006.01) | |
| B62K 11/00 | (2006.01) | |

(52) U.S. Cl.
CPC ............ B62D 11/003 (2013.01); B62D 11/04 (2013.01); G05D 1/0891 (2013.01); B62K 11/007 (2016.11)

(58) Field of Classification Search
None
See application file for complete search history.

(56) References Cited

U.S. PATENT DOCUMENTS

| | | | | |
|---|---|---|---|---|
| 5,971,091 A | * | 10/1999 | Kamen ..................... | A61G 5/04 180/218 |
| 2007/0084662 A1 | * | 4/2007 | Oikawa .................. | A63C 17/08 180/272 |

(Continued)

FOREIGN PATENT DOCUMENTS

| | | |
|---|---|---|
| JP | 2005-138630 | 6/2005 |
| JP | 2010-30436 | 2/2010 |

(Continued)

OTHER PUBLICATIONS

Makiko Sasaki, et al., "Personal Riding-type Wheeled Mobile Platform (4th Report)—Steering control using the rider's center of gravity-", Proceedings of IEEE International Conference on Robotics and Automation, 2004, 2 pages ( with English Abstract).

*Primary Examiner* — Thomas G Black
*Assistant Examiner* — Ana D Thomas
(74) *Attorney, Agent, or Firm* — Oblon, McClelland, Maier & Neustadt, L.L.P.

(57) ABSTRACT

A travelling apparatus including a controller that adds, when receiving a turning instruction, a first correction amount calculated based on rider's centroid information to a first rotation amount of a first driving wheel calculated based on the turning instruction to rotationally drive the first driving wheel and adds a second correction amount calculated based on rider's centroid information to a second rotation amount of a second driving wheel calculated based on the turning instruction to rotationally drive the second driving wheel is provided.

7 Claims, 7 Drawing Sheets

(56) References Cited

U.S. PATENT DOCUMENTS

| | | | |
|---|---|---|---|
| 2010/0025139 A1* | 2/2010 | Kosaka | B62D 61/00 180/218 |
| 2010/0030442 A1 | 2/2010 | Kosaka | |
| 2010/0038163 A1* | 2/2010 | Oikawa | B60L 15/2009 180/181 |
| 2011/0060513 A1* | 3/2011 | Oikawa | B60L 15/20 701/99 |
| 2011/0130925 A1* | 6/2011 | Oikawa | B60L 15/2036 701/41 |
| 2011/0282532 A1* | 11/2011 | Kosaka | B62K 11/007 701/22 |
| 2012/1016604 | 6/2012 | Inoue et al. | |
| 2013/0187576 A1* | 7/2013 | Oikawa | B60L 7/02 318/376 |
| 2014/0067178 A1* | 3/2014 | Taira | B62K 3/007 701/22 |
| 2014/0236426 A1* | 8/2014 | Kosaka | G05D 1/0891 701/41 |
| 2014/0297125 A1 | 10/2014 | Araki et al. | |
| 2014/0330507 A1* | 11/2014 | Oikawa | B62K 3/007 701/124 |
| 2017/0313350 A1* | 11/2017 | Oikawa | G05D 1/0891 |

FOREIGN PATENT DOCUMENTS

| | | |
|---|---|---|
| JP | 2014-198503 | 10/2014 |
| JP | 2015-54678 | 3/2015 |
| JP | 2015-128928 | 7/2015 |

* cited by examiner

TRAVELLING APPARATUS, CONTROL
METHOD OF TRAVELLING APPARATUS,
AND CONTROL PROGRAM OF
TRAVELLING APPARATUS

CROSS REFERENCE TO RELATED
APPLICATIONS

This application is based upon and claims the benefit of priority from Japanese patent application No. 2016-92508, filed on May 2, 2016, the disclosure of which is incorporated herein in its entirety by reference.

TECHNICAL FIELD

The present invention relates to a travelling apparatus, a control method of the travelling apparatus, and a control program of the travelling apparatus.

BACKGROUND

Travelling apparatuses that detect posture information using a gyro sensor, an acceleration sensor or the like and perform drive control based on the posture information that has been detected are known. Among these travelling apparatuses, inverted two-wheeled vehicles that control driving wheels by use of a posture control model of an inverted pendulum are known. Japanese Unexamined Patent Application Publication No. 2010-30436 discloses, for example, an inverted two-wheeled vehicle that can be moved forward or backward or turned by a rider moving his/her centroid forward or backward or inclining the handle to the right or left.

SUMMARY

When the travelling control disclosed in Japanese Unexamined Patent Application Publication No. 2010-30436 is employed, a phenomenon in which a difference occurs between a travelling track assumed by the rider at the time of turning and an actual travelling track has appeared. When the rider needs to turn the vehicle on site while rotating the right wheel and the left wheel in different directions, in particular, a phenomenon in which the vehicle is actually spirally turned with translation in the front-back direction that is not intended by the rider has been observed. In the travelling apparatus that drives the right and left wheels, when there is a positional deviation in the right-left direction, it is quite difficult to make the vehicle return to the right position.

The present invention has been made in order to solve the above problem and aims to provide a travelling apparatus that draws a track more faithful to the rider's intention with respect to a turning command.

A travelling apparatus according to a first aspect of the present invention includes: a riding part on which a rider rides; a first driving wheel configured to be attached to the riding part so that the first driving wheel is displaced in one side of the riding part, the first driving wheel being rotationally driven; a second driving wheel configured to be attached to the riding part so that the second driving wheel is displaced in another side of the riding part, the second driving wheel being rotationally driven independently from the first driving wheel; a receiving part configured to receive a turning instruction from the rider; an acquisition unit configured to acquire centroid information regarding the rider's centroid; and a controller configured to add, when the receiving part receives the turning instruction, a first correction amount calculated based on the centroid information acquired by the acquisition unit to a first rotation amount of the first driving wheel calculated based on the turning instruction to rotationally drive the first driving wheel and add a second correction amount calculated based on the centroid information acquired by the acquisition unit to a second rotation amount of the second driving wheel calculated based on the turning instruction to rotationally drive the second driving wheel.

According to a second aspect of the present invention, a control method of a travelling apparatus including: a riding part on which a rider rides; a first driving wheel configured to be attached to the riding part so that the first driving wheel is displaced in one side of the riding part, the first driving wheel being rotationally driven; and a second driving wheel configured to be attached to the riding part so that the second driving wheel is displaced in another side of the riding part, the second driving wheel being rotationally driven independently from the first driving wheel is provided, and the control method includes: a receiving step for receiving a turning instruction from the rider; an acquiring step for acquiring centroid information regarding the rider's centroid; and a controlling step for adding, when the turning instruction is received in the receiving step, a first correction amount calculated based on the centroid information acquired in the acquiring step to a first rotation amount of the first driving wheel calculated based on the turning instruction to rotationally drive the first driving wheel and adding a second correction amount calculated based on the centroid information acquired in the acquiring step to a second rotation amount of the second driving wheel calculated based on the turning instruction to rotationally drive the second driving wheel.

According to a third aspect of the present invention, a storage medium that stores a control program of a travelling apparatus including: a riding part on which a rider rides; a first driving wheel configured to be attached to the riding part so that the first driving wheel is displaced in one side of the riding part, the first driving wheel being rotationally driven; and a second driving wheel configured to be attached to the riding part so that the second driving wheel is displaced in another side of the riding part, the second driving wheel being rotationally driven independently from the first driving wheel is provided, and the travelling apparatus causes a computer to execute the following steps of: a receiving step for receiving a turning instruction from the rider; an acquiring step for acquiring centroid information regarding the rider's centroid; and a controlling step for adding, when the turning instruction is received in the receiving step, a first correction amount calculated based on the centroid information acquired in the acquiring step to a first rotation amount of the first driving wheel calculated based on the turning instruction to rotationally drive the first driving wheel and adding a second correction amount calculated based on the centroid information acquired in the acquiring step to a second rotation amount of the second driving wheel calculated based on the turning instruction to rotationally drive the second driving wheel.

In the aforementioned first to third aspects, the following structures may be additionally or selectively employed. That is, a rotation change amount of the second driving wheel by the second rotation amount may be decreased using the second correction amount to increase a rotation change amount of the first driving wheel by the first rotation amount using the first correction amount and the rotation change amount of the first driving wheel by the first rotation amount may be decreased using the first correction amount to increase the rotation change amount of the second driving wheel by the second rotation amount using the second correction amount. Further, the riding part may include a step part on which the rider stands and rides, the acquisition unit may include a first detection unit and a second detection unit provided in the step part, the first detection unit detecting a load by a left leg of the rider, the second detection unit detecting a load by a right leg of the rider, and the acquisition unit may acquire the centroid information based on results of the detection by the first detection unit and the second detection unit. Further, the first correction amount and the second correction amount may be calculated based on a rate of the displacement of the centroid in a direction of a line that connects the first driving wheel and the second driving wheel with respect to an interval between the first driving wheel and the second driving wheel. Further, the centroid information acquired by the acquisition unit due to an operation of moving the centroid by the rider may be received as the turning instruction.

According to the present invention, it is possible to provide a travelling apparatus that draws a more faithful track with respect to a turning command.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

While the present invention will be described hereinafter with reference to an embodiment, the invention set forth in claims is not limited to the following embodiment. Further, not all the structures described in the embodiment are necessary as means for solving the problem.

Figure 1:
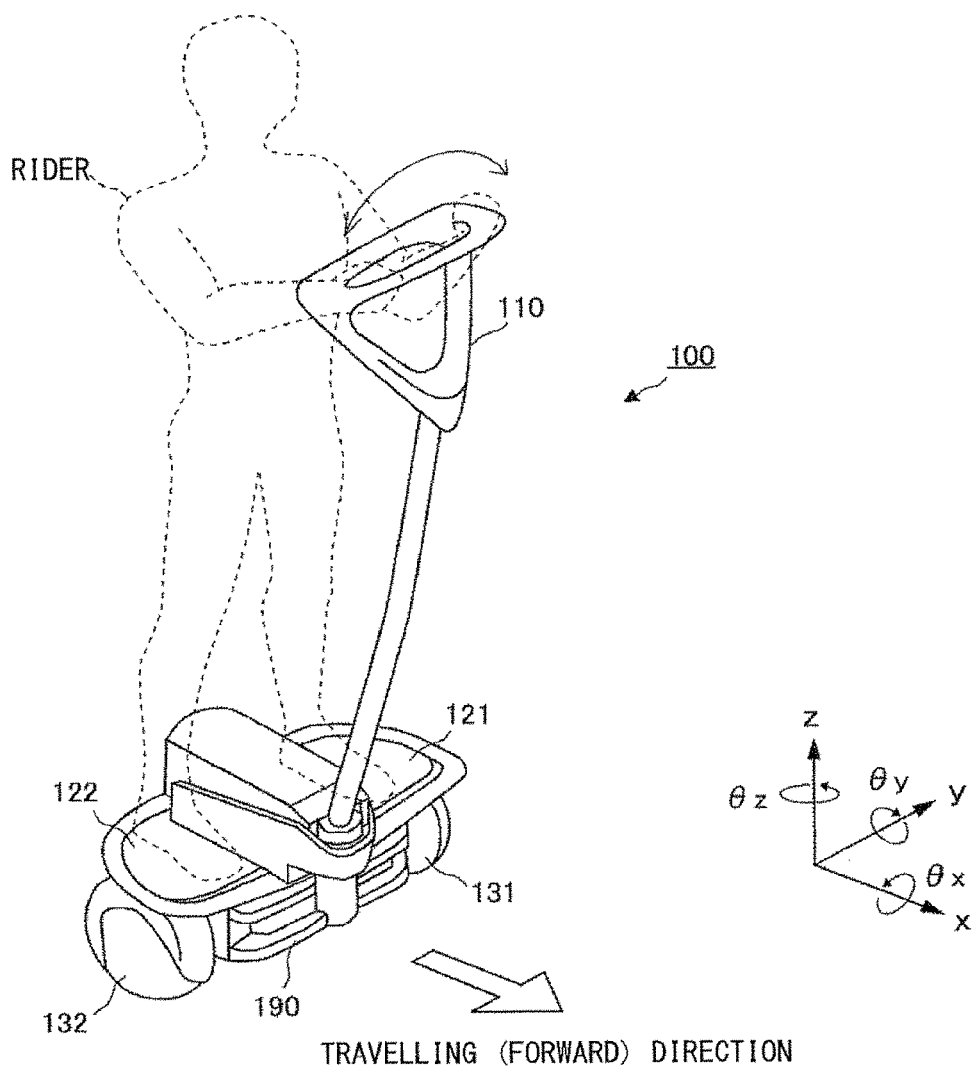
FIG. 1 is an external perspective view of a first inverted two-wheeled vehicle according to an embodiment.

FIG. 1 is an external perspective view of a first inverted two-wheeled vehicle 100 according to this embodiment. The inverted two-wheeled vehicle 100 includes a handle 110, a left step 121, a right step 122, a left wheel 131, and a right wheel 132 attached to a base 190 that forms the whole frame. The handle 110 is gripped by a rider and serves as an instruction receiving part for receiving a forward instruction and a turning instruction. Specifically, when the rider gives a forward instruction to the steps 121 and 122 by inclining the rider's centroid forwardly, the inverted two-wheeled vehicle 100 accelerates forwardly. When the inclination angle to the forward side is further increased, the acceleration forward increases. When the rider gives a left turning instruction by inclining the handle 110 to the left side with respect to the travelling direction, the inverted two-wheeled vehicle 100 turns in the left direction. When the rider gives a right turning instruction by inclining the handle 110 to the right side with respect to the travelling direction, the inverted two-wheeled vehicle 100 turns in the right direction. When the inclination angle to the right or left side is increased, the turning radius in the corresponding side decreases. Further, when the rider inclines the handle 110 to the right or left side while inclining the rider's centroid to the forward side, the inverted two-wheeled vehicle 100 executes an operation in which the forward acceleration instruction and the turning instruction are combined.

While a case in which the rider rides on the inverted two-wheeled vehicle 100 while standing on it is assumed in this embodiment, the left step 121 and the right step 122 respectively serve as riding parts on which the rider puts his/her left leg and the right leg. The steps 121 and 122 may be fixed to the base 190 or may be provided with a link mechanism so that supporting surfaces become inclined in accordance with the turning in the right-left direction.

The left wheel 131 is a driving wheel that is displaced leftward with respect to the center of the left step 121 and the right step 122 and is rotationally driven by a motor that will be described later. The right wheel 132 is a driving wheel that is displaced rightward with respect to the center of the left step 121 and the right step 122 and is rotationally driven by a motor that will be described later. The left wheel 131 and the right wheel 132 are arranged in parallel with each other on the same axis. Therefore, when the left wheel 131 and the right wheel 132 rotate in the same direction at the same velocity, the vehicle moves forward and when they rotate in velocities different from each other, the vehicle turns right or left. The inverted two-wheeled vehicle 100 according to this embodiment is a coaxial two-wheeled vehicle that controls rotations of the wheels 131 and 132, which are driving wheels, based on a posture control model of an inverted pendulum. A controller (described later) detects the whole posture of the inverted two-wheeled vehicle 100 on which the rider rides and controls the rotary drive of the wheels 131 and 132 so that the state in which the rider rides on the inverted two-wheeled vehicle 100 can be stably maintained. The specific control will be described later.

In the coordinate systems of the inverted two-wheeled vehicle 100, as shown in FIG. 1, a forward direction that is perpendicular to the axle direction in which the two wheels are connected to each other is defined to be an x-axis positive direction, a direction toward the wheel 131 in the axle direction in which the two wheels are connected to each other is defined to be a y-axis positive direction, and a direction toward the head part of the rider in the direction that is perpendicular to both the x axis and the y axis is defined to be a z-axis positive direction. Further, θx (roll axis), θy (pitch axis), and θz (yaw axis) in which the right-hand direction with respect to the respective orthogonal axes is the positive direction are defined.

Figure 2:
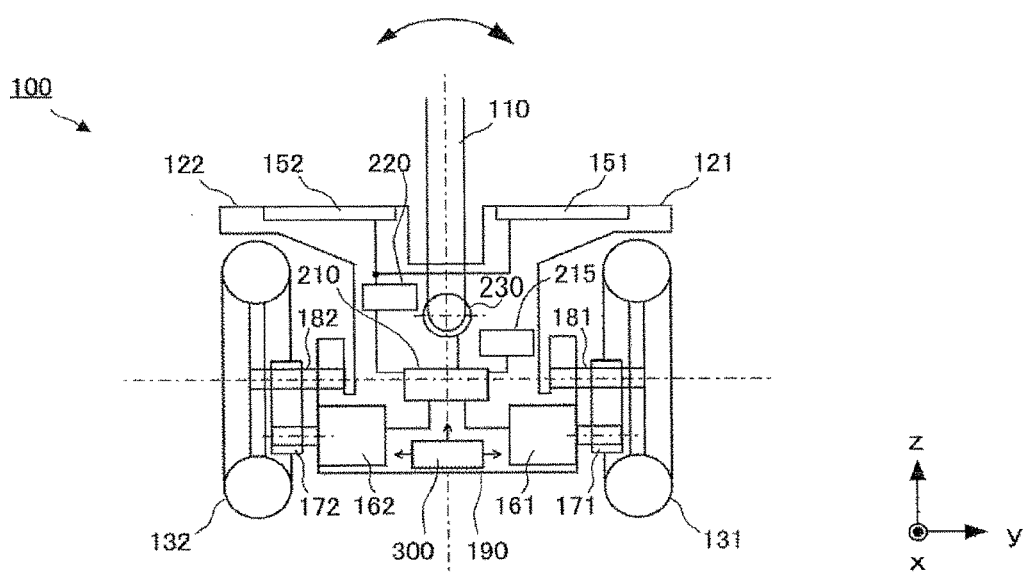
FIG. 2 is a schematic view showing a main structure of the inverted two-wheeled vehicle.

FIG. 2 is a schematic view showing a main structure of the inverted two-wheeled vehicle 100. Specifically, FIG. 2 schematically shows a state in which the cross section on the yz plane is observed from the x-axis positive side and component blocks related to a turning control overlap one another.

The right and left two wheels 131, 132 are rotatably supported by the base 190 so that axles 181 and 182 thereof are aligned. A motor 161 to drive the left wheel 131 and a motor 162 to drive the right wheel 132 are fixedly arranged in the base 190. The driving force of the motor 161 is transmitted to the axle 181 via a transmission mechanism 171 that also serves as a decelerator and rotationally drives the wheel 131. The driving force of the motor 162 is transmitted to the axle 182 via a transmission mechanism 172 that also serves as a decelerator and rotationally drives the wheel 132. That is, the wheels 131 and 132 are separately controlled by the motors 161 and 162 and the transmission mechanisms 171 and 172 that are independent from each other, respectively, and are rotationally driven.

One end of the handle 110 is pivotally supported by the base 190. A rotation detector 230 includes an angle detection sensor such as an encoder. The rotation detector 230 is provided in the pivotally supporting part and detects an oscillation angle of the handle 110 in the roll-axis direction.

A load sensor 151 is a load sensor embedded in the step 121 on which the rider puts his/her left leg and detects the load positions from the left leg of the rider and the distribution thereof. The load sensor 152 is a load sensor embedded in the step 122 on which the rider puts his/her right leg and detects the load positions from the right leg of the rider and the distribution thereof. The load sensors 151 and 152 may be, for example, sheet-like sensors in which a plurality of piezoelectric films are arranged. A centroid detector 220 acquires the results of the detection in the load sensors 151 and 152 and calculates the rider's centroid information.

The centroid position of an upstanding human is said to be substantially at the umbilicus in a three-dimensional view. Accordingly, when the rider rides on the respective centers of the steps 121 and 122 while standing upright thereon, the centroid position in the y-axis direction is in the position in which y=0. That is, the load detected by the load sensor 151 becomes equal to the load detected by the load sensor 152 and the centroid detector 220 outputs y=0 as the centroid position in the y-axis direction. While the centroid is originally expressed in three-dimensional coordinates, the centroid position in the y-axis direction that affects the turning operation may be simply referred to as a centroid position in this embodiment. Further, the load sensors 151 and 152 may be configured to be able to detect a two-dimensional load distribution in the xy plane direction. In this case, the centroid detector 220 is able to output the centroid position in the x-axis direction and the centroid position in the y-axis direction. However, the centroid position in the y-axis direction is used as the centroid information at the time of turning described later.

A controller 210 is, for example, a CPU, and integrally controls components of the inverted two-wheeled vehicle 100. As will be described later, the controller 210 receives, for example, the output of the centroid detector 220 and the output of the rotation detector 230, calculates the angular velocities of the wheels 131 and 132, and generates a drive control signal to drive the motors 161 and 162 in accordance with the result of the calculation, to thereby drive the motors 161 and 162. Control programs are stored in a memory 215 in advance and the controller 210 reads out the control program from the memory 215 at the time of start-up and executes various kinds of control. The memory 215 is a non-volatile storage medium and may be, for example, a solid state drive. The memory 215 stores, besides the control programs, various parameter values, functions, look-up tables and the like used for controls.

A battery 300 is, for example, a secondary battery like a lithium ion battery and supplies power to the motors 161 and 162, the controller 210 and the like via a transformer circuit or the like. The secondary battery can be charged, for example, by a home AC power source and may be configured to be attached to or detached from the vehicle.

Figure 3:
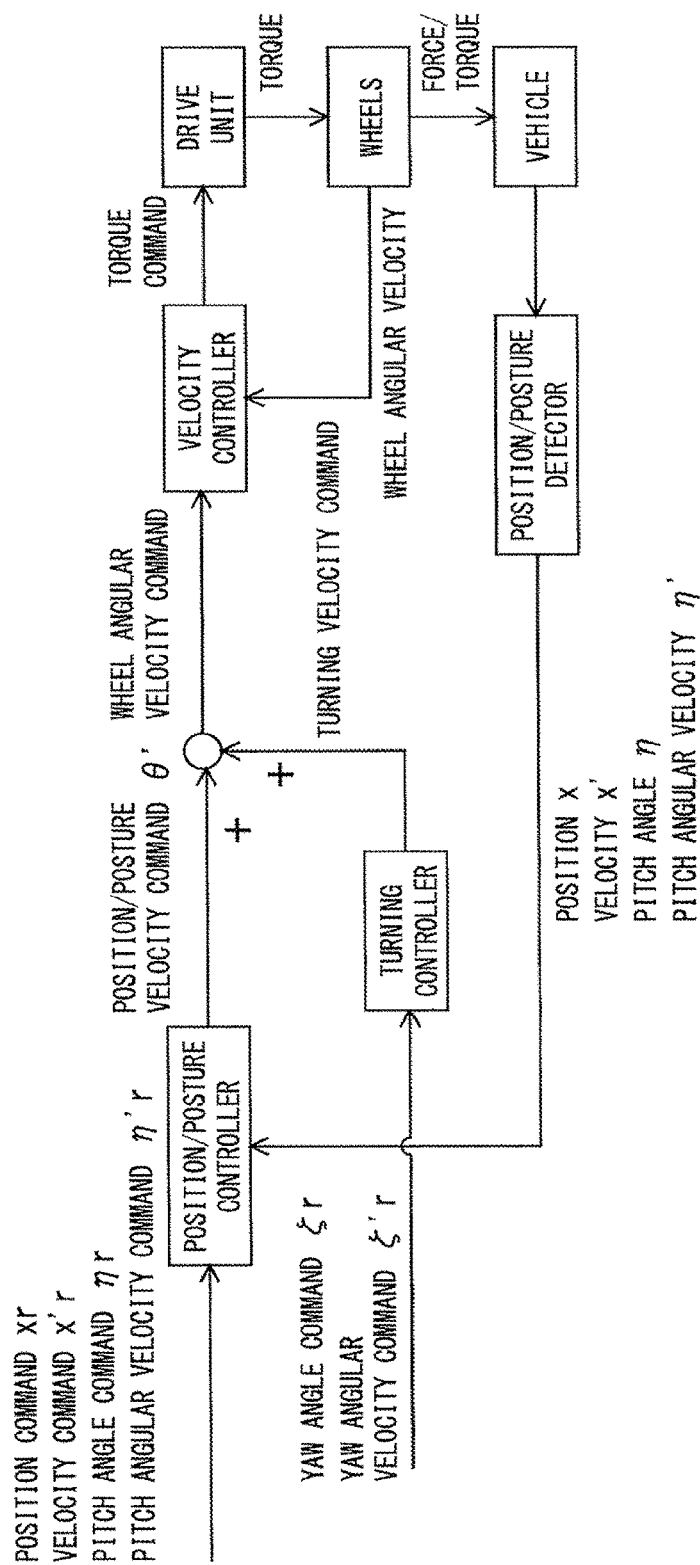
FIG. 3 is a control block diagram showing a concept of an operation control system of the inverted two-wheeled vehicle.

The concept of an operation control system of the inverted two-wheeled vehicle 100 will be briefly described. FIG. 3 is a control block diagram showing the concept of the operation control system of the inverted two-wheeled vehicle 100. In this description, for the sake of simplification of the description, the inverted two-wheeled vehicle 100 is simply called a vehicle. Further, the controller 210 integrally serves as controllers expressed as functional blocks in the following description.

First, variables used in the following description will be explained. The symbol $\eta$ denotes a pitch angle of the vehicle and $\eta'$ denotes a pitch angular velocity. The symbol x indicates the position of the vehicle and x' denotes the velocity. The pitch angle the pitch angular velocity $\eta'$, the position x, and the velocity x' denote detected values. Further, $\eta_r$ denotes a pitch angle command and $\eta'_r$ denotes a pitch angular velocity command. The symbol $x_r$ denotes a position command and $x'_r$ denotes a velocity command. The symbol $\zeta_r$ denotes a yaw angle command and $\zeta'_r$ denotes a yaw angular velocity command. The pitch angle command $\eta_r$, the pitch angular velocity command the position command $x_r$, the velocity command $x'_r$, the yaw angle command $\zeta_r$, and the yaw angular velocity command $\zeta'_r$ denote command values, which are target values. That is, variables with subscript r denote command values and variables without subscript r denote detected values. Further, 2L denotes a tread width, which is a distance between the wheels, and $R_w$ denotes a wheel radius.

A drive unit independently drives two wheels. The drive unit includes a motor and an amplifier for driving the wheels. The drive unit performs torque control based on the torque command that is input. The torque is added to the wheels in accordance with the rotation of the motor. Further, a reaction force of the torque is applied to the vehicle body in accordance with the rotation of the motor and a force as a reaction force from the ground is applied to the vehicle body in accordance with the rotation of the wheels.

A wheel angular velocity detector (not shown) detects a wheel angle and a wheel angular velocity as a relative angle and a relative angular velocity between a main body and the wheels. The wheel angular velocity detector detects the wheel angle and the wheel angular velocity from, for example, information from the encoder provided on a rotary shaft of the motor.

A position/posture detector detects the position x, the velocity x', the pitch angle $\eta$, and the pitch angular velocity $\eta'$ of the vehicle. The position/posture detector detects the position x and the velocity x' using a GPS or a beacon and detects the pitch angle $\eta$ and the pitch angular velocity $\eta'$ using a gyro sensor or an acceleration sensor.

A position/posture controller controls the position and the posture of the vehicle so that the position x, the velocity x', the pitch angle $\eta$, and the pitch angular velocity $\eta'$ detected by the position/posture detector follow the position command $x_r$, the velocity command $x'_r$, the pitch angle command $\eta_r$, and the pitch angular velocity command $\eta'_r$ to be input. That is, the position/posture controller generates the position/posture velocity command based on the position x, the velocity x', the pitch angle $\eta$, and the pitch angular velocity $\eta'$ detected by the position/posture detector and the position command $x_r$, the velocity command $x'_r$, the pitch angle command $\eta_r$, and the pitch angular velocity command $\eta'_r$ to be input.

More specifically, the position/posture controller calculates the difference between the position command $x_r$, the velocity command $x'_r$, the pitch angle command $\eta_r$, and the pitch angular velocity command $\eta'_r$ to be input and the position $x$, the velocity $x'$, the pitch angle $\eta$, and the pitch angular velocity $\eta'$ detected by the position/posture detector and performs PD (proportional-derivative) control to converge the difference to 0. Normally, the values of the pitch angle command $\eta_r$ and the pitch angular velocity command $\eta'_r$ to be input are 0 and the position/posture controller performs posture control so that the pitch angle $\eta$ and the pitch angular velocity $\eta'$ generated due to the centroid movement of the rider are kept to 0.

The position/posture controller calculates the position/posture velocity command $\theta'$ using the following Expression (1) by the PD control. In Expression (1), $K_{pp}$ and $K_{px}$ each denote a proportional gain and $K_{dp}$ and $K_{dx}$ each denote a derivative gain.

$$\theta'=K_{pp}(\eta_r-\eta)+K_{dp}(\eta'_r-\eta')+K_{px}(x_r-x)+K_{dx}(X'_r-x') \quad (1)$$

Due to these control gains, the following capability of motors in response to the position command $x_r$, the velocity command $x'_r$, the pitch angle command $\eta_r$, and the pitch angular velocity command $\eta'_r$ changes. If the proportional gain $K_{pp}$ is adjusted to a small value, for example, motor rotors operate with a delay in following, to slowly follow the commands. If the proportional gain $K_{pp}$ is adjusted to a large value, the motor rotors follow the commands at a high speed. The control performed by the position/posture controller is not limited to the PD control, but may be H∞ control, fuzzy control or the like.

The turning controller generates the turning command $\gamma$ based on the yaw angle command $\zeta_r$ and the yaw angular velocity command to be input. The yaw angle command and the yaw angular velocity command $\zeta'_r$ are generated based on the inclination angle in which the rider inclines the handle 110 in the right or left direction with respect to the travelling direction. In this description, for the sake of simplicity of the description, it is assumed that the yaw angle command $\zeta_r$ is not generated and the yaw angular velocity command $\zeta'_r$ is generated due to the inclination of the handle 110. In this case, the turning controller calculates the turning command $\gamma$ from the tread width 2L, the wheel radius $R_w$, and the yaw angular velocity command $\zeta'_r$ to be input, from the following Expression (2).

$$\gamma = \frac{L \cdot \zeta'_r}{R_w} \quad (2)$$

The turning controller outputs $K_{py} \cdot \gamma$, which is obtained by multiplying the turning command $\gamma$ by a control gain $K_{py}$, as the turning velocity command. The position/posture velocity command $\theta'$ output from the position/posture controller and the turning velocity command $K_{py} \cdot \gamma$ output from the turning controller are added by an adder and the resultant value is input to a velocity controller as a wheel angular velocity command. A left wheel angular velocity command $\theta'_L$ to the left wheel 131 is expressed by the following Expression (3).

$$\theta'_L=\theta'K_{py} \cdot \gamma \quad (3)$$

In a similar way, a right wheel angular velocity command $\theta'_R$ to the right wheel 132 is expressed by the following Expression (4).

$$\theta'_R=\theta'+K_{py} \cdot \gamma \quad (4)$$

The velocity controller adds a correction amount (described later), which is one characteristic of this embodiment, to the left wheel angular velocity command $\theta'_L$ and the right wheel angular velocity command $\theta'_R$. The details of the addition of the correction amount will be described later. The velocity controller then calculates the difference between the wheel angular velocity command in which the correction amount is added and the wheel angular velocity that has been detected, controls the PI (proportional-derivative) to converge the difference to 0, and controls the velocity so that the detected value coincides with the command value. That is, the velocity controller generates a torque command for the right and left wheels based on the wheel angular velocity command in which the correction amount is added and the wheel angular velocity that has been detected and outputs the torque command to the drive unit.

The applicants have found, in the conventional control based on the wheel angular velocity command in which the aforementioned correction amount is not added, the phenomenon in which a difference occurs between the travelling track assumed at the time of turning and the actual travelling track has appeared. When the rider needs to turn the vehicle on site while rotating the right wheel and the left wheel in different directions, in particular, a phenomenon in which the vehicle is actually spirally turned with translation in the front-back direction that is not intended by the rider has been observed.

The applicants have analyzed this phenomenon and have found that the deviation of the travelling track occurs due to the rider's centroid moving in the right-left direction or in the front-back direction when the rider gives the turning command or while the travelling apparatus is turning. When the rider inclines the handle to the right or left, for example, the position of the rider's centroid with respect to the inverted two-wheeled vehicle moves to the right or left. When the inverted two-wheeled vehicle starts turning in this state, the body of the rider turns after some delay. Then the centroid is deviated in the front-back direction in the middle of the turning due to a temporal delay in following due to the flexibility of the body of the rider, which causes a movement of the vehicle in the front-back direction due to a feedback control to keep the posture even when the handle is not inclined forward or backward. This results in the inverted two-wheeled vehicle drawing a spiral travelling track different from the intention of the rider although the rider desires to perform, for example, a turn on site.

If the spiral travelling track is drawn as described above, when the turning of the vehicle is stopped, the vehicle translates in either one of the right and left directions with respect to the original position. In the travelling apparatus like the inverted two-wheeled vehicle that drives the right and left wheels, when the position of the vehicle is deviated in the right-left direction, the rider needs to turn around the vehicle several times to make the vehicle return to the right position, which prevents smooth travelling. In this embodiment, a correction amount is added to the wheel angular velocity command, to thereby achieve travelling more faithful to the turning command. This correction will be described hereinafter in detail.

Figure 4:
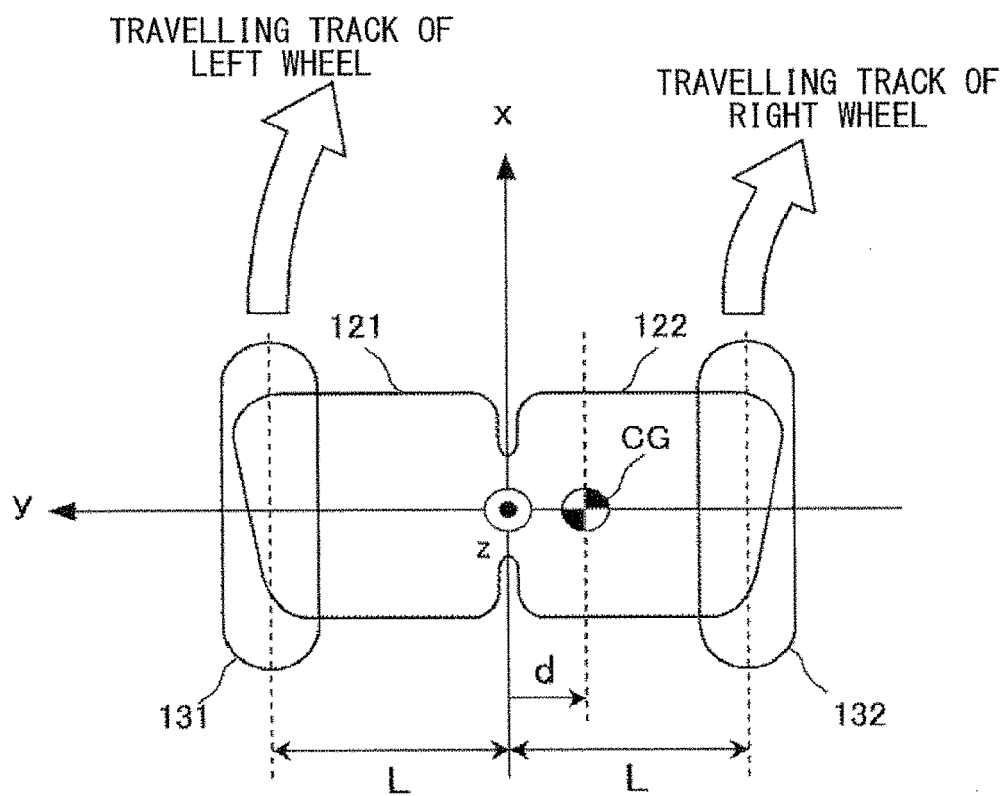
FIG. 4 is an explanatory diagram for describing a concept and an operation of a correction with respect to a turning command.

FIG. 4 is an explanatory diagram for describing the concept and the operation of the correction with respect to the turning command. The example shown in FIG. 4 assumes a case in which the rider gives an instruction to turn right during the forward travelling. In this case, as described above, the rider's centroid CG is deviated in the right-left direction and this deviation amount is denoted by d. As shown in FIG. 4, since the left direction of the y axis is a positive direction, the deviation amount d has a negative value. Further, the turning command γ to turn right has a negative value.

In FIG. 4 in which the vehicle turns in the right direction, the rider's centroid CG is deviated in the right direction (y-axis negative direction). Therefore, in order to reduce the deviation of the travelling track due to the deviation of the rider's centroid CG, it will be understood that the rotation amount to be added to the left wheel 131 may be made larger than the conventional control amount and the rotation amount to be subtracted from the right wheel 132 may be made smaller than the conventional control amount in accordance with the deviation amount. In other words, the rotation change amount of the left wheel 131 may be made larger than the conventional control amount and the rotation change amount of the right wheel 132 may be made smaller than the conventional control amount. On the other hand, when the vehicle turns in the left direction, the rider's centroid CG is deviated in the left direction (y-axis positive direction). Therefore, in order to reduce the deviation in the travelling track due to the deviation in the rider's centroid CG, it will be understood that the rotation amount to be subtracted from the left wheel 131 may be made smaller than the conventional control amount and the rotation amount to be added to the right wheel 132 may be made larger than the conventional control amount in accordance with the deviation amount. In other words, the rotation change amount of the left wheel 131 may be made smaller than the conventional control amount and the rotation change amount of the right wheel 132 may be made larger than the conventional control amount.

In order to make corrections based on the above method, in this embodiment, the left wheel angular velocity command $\theta'_L$ and the right wheel angular velocity command $\theta'_R$ are corrected as shown in the following Expressions (5) and (6).

$$\theta'_L = \theta' - K_{py} \cdot \frac{L-d}{L} \cdot \gamma \quad (5)$$
$$= \theta' - K_{py} \cdot \gamma + K_{py} \cdot \frac{d}{L} \cdot \gamma$$

$$\theta'_R = \theta' - K_{py} \cdot \frac{L+d}{L} \cdot \gamma \quad (6)$$
$$= \theta' + K_{py} \cdot \gamma + K_{py} \cdot \frac{d}{L} \cdot \gamma$$

From Expression (5), it will be understood that $\theta'_L$ that has been corrected is obtained by adding $K_{py} \cdot (d/L) \cdot \gamma$ to $\theta'_L$ in Expression (3), which is a conventional control amount, as the correction amount. That is, it will be understood that the correction amount with respect to $\theta'_L$ is calculated based on the rate of the displacement of the centroid in the y-axis direction with respect to the interval between the wheels 131 and 132. When the vehicle turns in the right direction, both d and γ are negative values. Therefore, it will be understood that the rotation amount to be added as the turning command becomes larger than the conventional control amount (=|−$K_{py} \cdot \gamma$|). On the other hand, when the vehicle turns in the left direction, both d and γ are positive values. Therefore, it will be understood that the rotation amount to be subtracted as the turning command becomes smaller than the conventional control amount (=|−$K_{py} \cdot \gamma$|).

Similarly, from Expression (6), it will be understood that $\theta'_R$ that has been corrected is obtained by adding $K_{py} \cdot (d/L) \cdot \gamma$ to $\theta'_R$ in Expression (4), which is a conventional control amount, as the correction amount. It will therefore be understood that the correction amount with respect to $\theta'_R$ is also calculated based on the rate of the displacement of the centroid in the y-axis direction with respect to the interval between the wheels 131 and 132. When the vehicle turns in the right direction, both d and γ are negative values. Therefore, it will be understood that the rotation amount to be subtracted as the turning command becomes smaller than the conventional control amount (=|+$K_{py} \cdot \gamma$|). On the other hand, when the vehicle turns in the left direction, both d and γ are positive values. Therefore, it will be understood that the rotation amount to be added as the turning command becomes larger than the conventional control amount (=|+$K_{py} \cdot \gamma$|).

As described above, by using $\theta'_L$ and $\theta'_R$ that have been corrected, it can be expected that the inverted two-wheeled vehicle 100 travels along the track that is closer to the assumed track. Since the correction amount is added to the conventional control amount as described above, as described with reference to FIG. 3, the velocity controller is able to calculate the correction amount, add the correction amount to the wheel angular velocity command that is input, and output $\theta'_L$ and $\theta'_R$. Alternatively, since the second term on the right side in the first formula of each of Expressions (5) and (6) corresponds to the turning velocity command, the turning controller may calculate the turning velocity command which includes the correction amount and output the turning velocity command. Since $\theta'_L$ and $\theta'_R$ are wheel angular velocity commands, the "rotation amount" and the "correction amount" in the aforementioned description are the "rotation amount" and the "correction amount" per unit time and are values having the dimension of the angular velocity.

Figure 5:
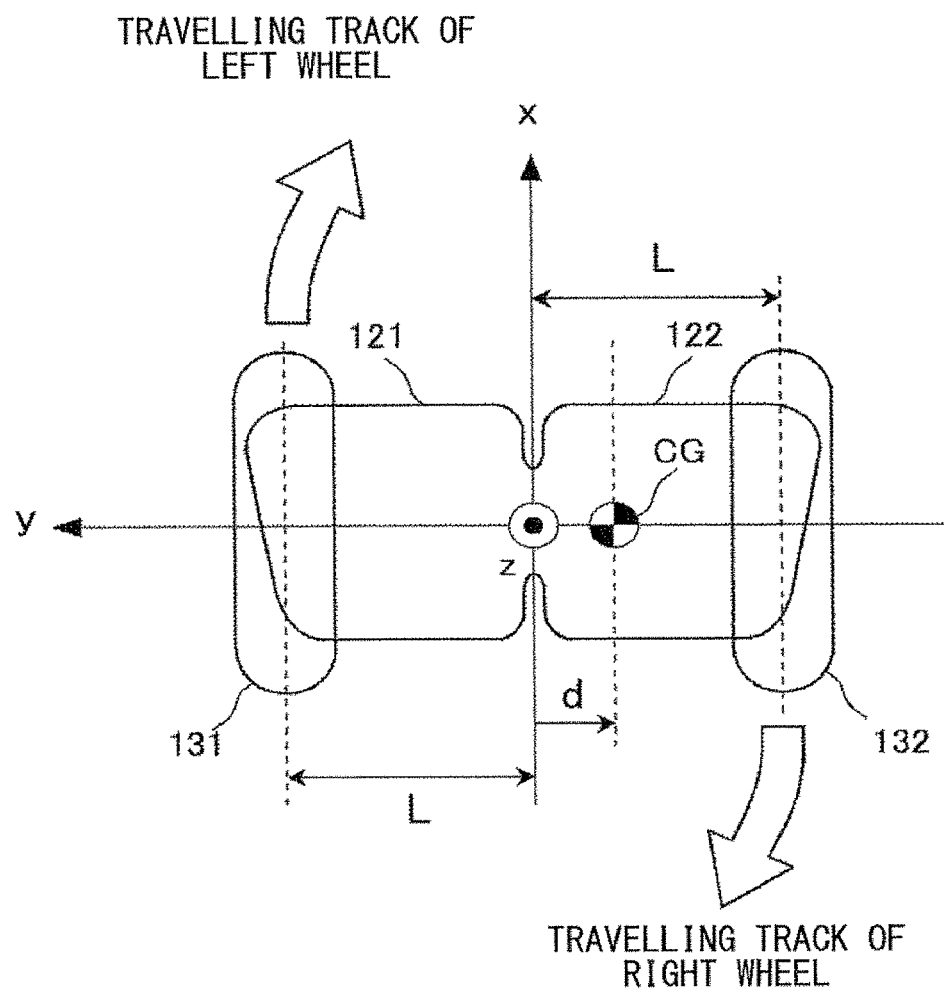
FIG. 5 is an explanatory diagram for describing an operation when there is no forward instruction.

FIG. 5 is an explanatory diagram for describing a right turning operation when there is no forward instruction. When the rider does not incline the handle 110 in the forward direction and inclines the handle 110 in the right direction as much as possible, the inverted two-wheeled vehicle 100 tends to turn on site (a turn that is similar to a so-called pivot turn). When the inverted two-wheeled vehicle 100 turns on site to the right, if the position/posture velocity command θ' to keep the posture of the vehicle is assumed to be substantially 0, Expression (5) can be expressed by the following expression.

$$\theta'_L = -K_{py} \cdot \gamma + K_{py} \cdot \frac{d}{L} \cdot \gamma \quad (7)$$

Since γ is a negative value, the first term on the right side indicates that the left wheel 131 is rotated forward at a constant angular velocity. Since d is also a negative value, the correction amount of the second term on the right side becomes positive as a whole, which means the angular velocity of the forward rotation is increased. Further, Expression (6) is expressed by the following expression.

$$\theta'_R = K_{py} \cdot \gamma + K_{py} \cdot \frac{d}{L} \cdot \gamma \quad (8)$$

Since γ is a negative value, the first term on the right side indicates that the right wheel 132 is rotated in reverse at a constant angular velocity. Considering that d is also a negative value and |d/L|<1 is satisfied, the correction amount in the second term on the right side becomes positive as a whole, which means that the angular velocity of the reverse rotation is decreased. According to the control stated above, a turning operation on site without spiral turns can be expected.

Figure 6:
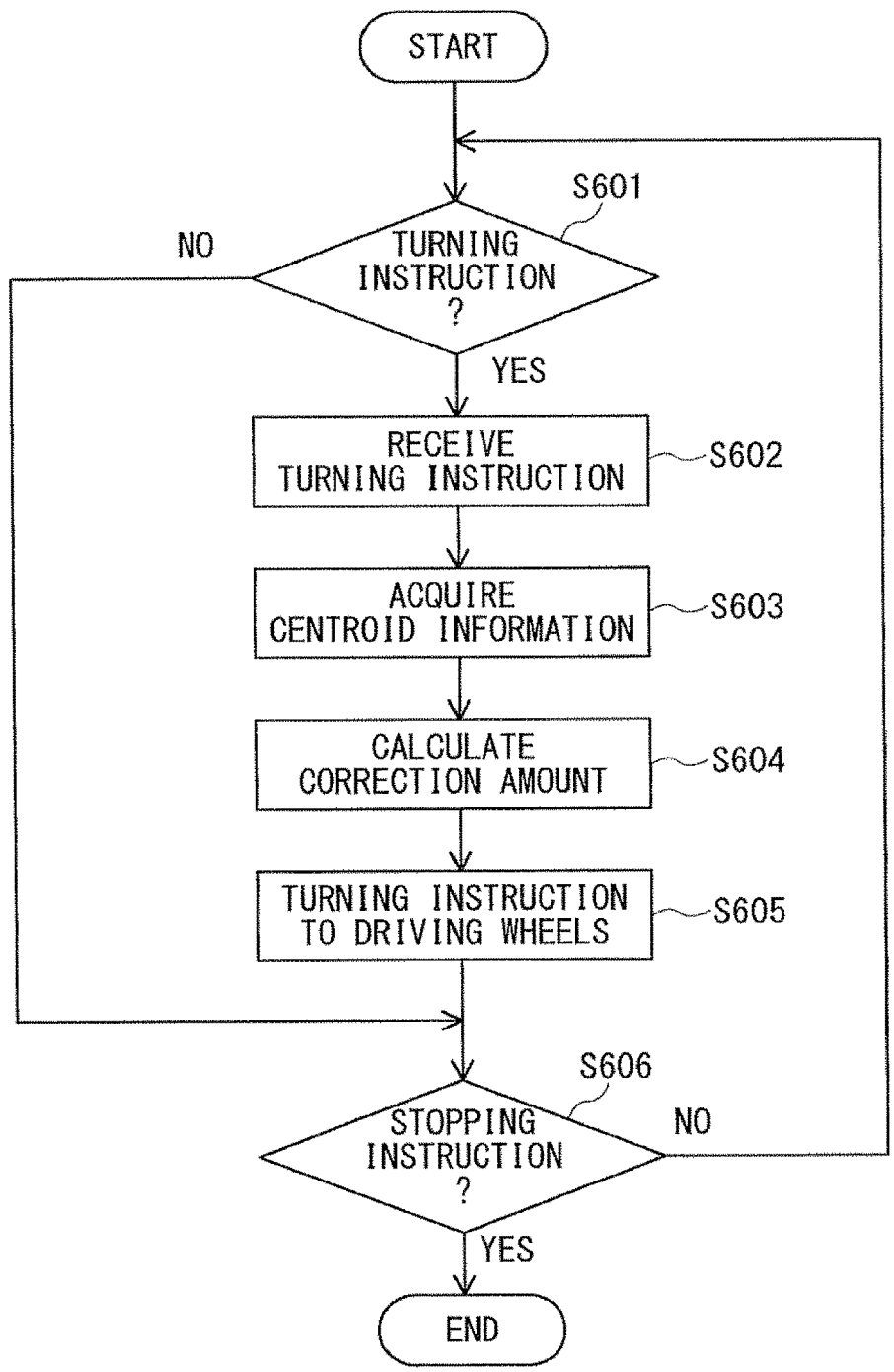
FIG. 6 is a flow diagram for describing a process flow with respect to the turning command.

FIG. 6 is a flow diagram for describing a process flow with respect to the turning command. The flow starts from the time the rider begins to ride on the inverted two-wheeled vehicle 100 or when the rider travels forward.

The controller 210 determines, in Step S601, whether the rider has given a turning instruction. Specifically, the controller 210 acquires the output of the rotation detector 230 to determine whether the handle 110 has been inclined in the right-left direction. When it is determined that the rider has given the turning instruction, the process goes to Step S602 and when it is determined that the rider has not given the turning instruction, the process goes to Step S606.

In Step S602, the controller 210 receives the turning instruction. Specifically, the controller 210 acquires the inclination direction and the inclination degree of the handle 110 from the output of the rotation detector 230 to calculate the turning command corresponding to the turning instruction. The process then goes to Step S603 to acquire the centroid information. Specifically, the load distribution in the y-axis direction detected by the centroid detector 220 using the output of the load sensors 151 and 152 is acquired as the rider's centroid information. More specifically, the deviation amount d described with reference to FIG. 4 is calculated from this centroid information.

The process then goes to Step S604, where the controller 210 calculates the correction amount described with reference to FIGS. 4 and 5 to determine the left wheel angular velocity command $\theta'_L$ and the right wheel angular velocity command $\theta'_R$. Then in Step S605, the torque command according to these wheel angular velocity commands is generated and the generated command is given to the motors 161 and 162, whereby the wheels 131 and 132 are driven. Then the process goes to Step S606.

The controller 210 determines whether the rider has given a stopping instruction in Step S606. When it is determined that the rider has not given the stopping instruction, the process goes back to Step S601. That is, Steps S602 to S605 are repeated while the rider keeps giving the turning instructions. It is therefore possible to re-calculate the correction amount and correct the turning operation substantially in real time even when the rider wobbles due to the turn. This loop makes one rotation in, for example, 2 msec. On the other hand, when it is determined that the rider has given the stopping instruction, the controller 210 stops the drive of the motor and stops the travelling of the inverted two-wheeled vehicle 100.

While the inverted two-wheeled vehicle 100 described above is a coaxial two-wheeled vehicle based on a posture control model of an inverted pendulum, the aforementioned control method can be applied to various travelling apparatuses. In the coaxial two-wheeled vehicle based on the control model of the inverted pendulum, the receiving part that receives the travelling instruction from the rider is not limited to being the handle. Further, the rider may not stand on the riding part and the vehicle may be a two-wheeled vehicle provided with a seat. Further, the vehicle may be a three-wheeled vehicle or a four-wheeled vehicle that is equipped with one or more auxiliary wheels in addition to the coaxial two wheels and may not perform control of the inverted pendulum. Further, the present invention is not limited to the case in which one person rides on the vehicle and a plurality of persons may ride on the vehicle. When a plurality of riders ride on the vehicle, the vehicle is configured to be able to detect the whole centroid movement of all the riders. Further, the driving source that drives the driving wheels is not limited to the electric motor and may be, for example, an internal-combustion engine. At any rate, the aforementioned control method may be applied to the travelling apparatus including two independent driving wheels in which the rider's centroid movement affects the travelling.

Figure 7:
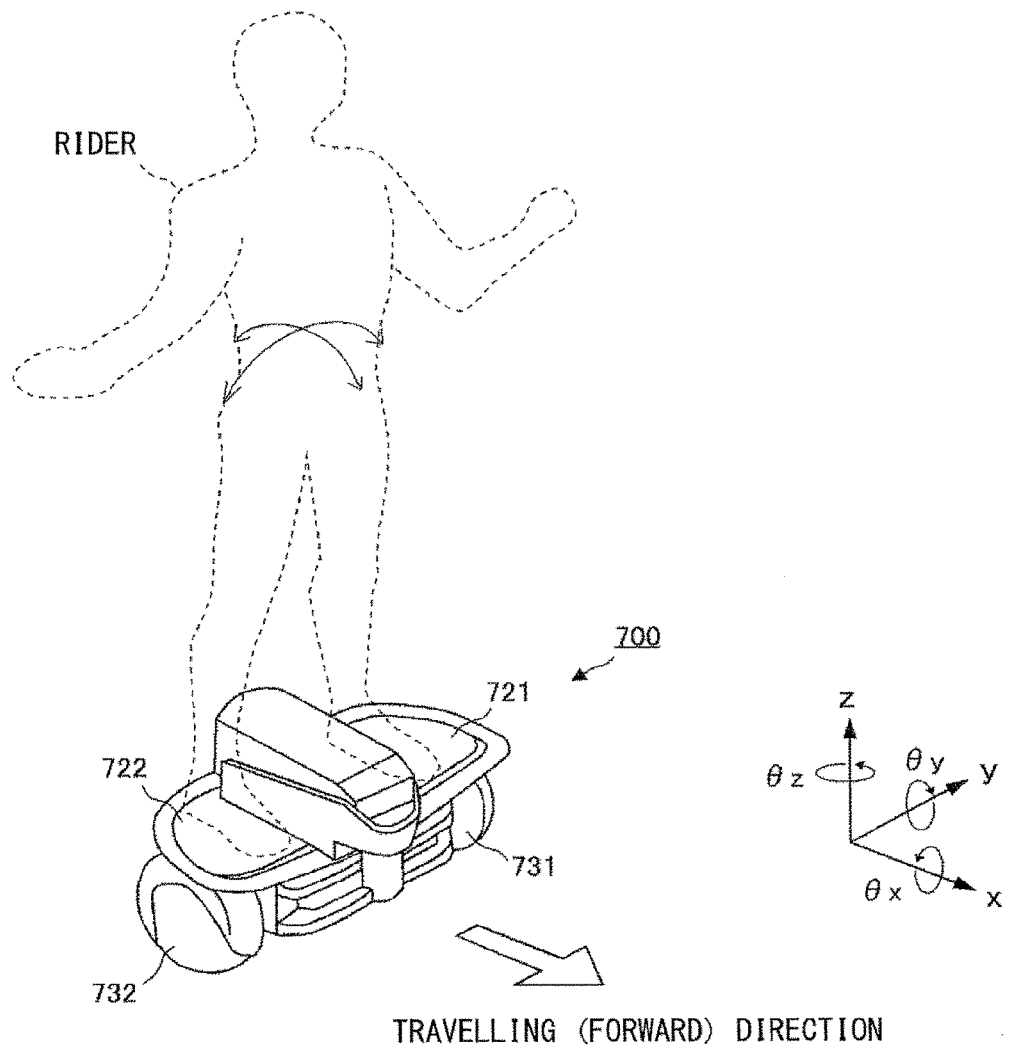
FIG. 7 is an external perspective view of a second inverted two-wheeled vehicle according to a modified example.

A modified example will be briefly described with reference to the drawings. FIG. 7 is an external perspective view of a second inverted two-wheeled vehicle 700 according to the modified example. The inverted two-wheeled vehicle 700 does not include the handle to which the rider gives the travelling instruction, unlike the inverted two-wheeled vehicle 100. The rider is able to give the travelling instruction by inclining his/her body. Specifically, when the rider inclines his/her body in the forward direction, the inverted two-wheeled vehicle 700 moves forward and when the rider inclines his/her body to the right or left, the inverted two-wheeled vehicle 700 turns accordingly. The inverted two-wheeled vehicle 700 includes, similar to the inverted two-wheeled vehicle 100, load sensors that detect the load distributions of the right and left legs embedded in the left step 721 and the right step 722. Therefore, the centroid detectors also serve as receiving parts that receive the travelling instructions from the rider.

In this case, the turning command $\gamma$ may be defined to be the following Expression $$\gamma = \frac{d}{L} \qquad (9)$$

to make the turning command $\gamma$ proportional to the rider's centroid movement so that the control can be simplified and the left wheel angular velocity command $\theta'_L$ and the right wheel angular velocity command $\theta'_R$ at this time may be expressed by the following Expressions (10) and (11).

$$\begin{aligned} \theta'_L &= \theta' - K_{py} \cdot \frac{L-d}{L} \cdot \gamma \\ &= \theta' - K_{py} \cdot \gamma + K_{py} \cdot \gamma^2 \end{aligned} \qquad (10)$$

$$\begin{aligned} \theta'_R &= \theta' - K_{py} \cdot \frac{L+d}{L} \cdot \gamma \\ &= \theta' + K_{py} \cdot \gamma + K_{py} \cdot \gamma^2 \end{aligned} \qquad (11)$$

According to the above expressions (10) and (11), the rider moves his/her centroid toward the left direction to turn left and moves his/her centroid toward the right direction to turn right. However, when the rider greatly inclines his/her body in one direction while gripping the gripped part fixed to the base, for example, the rider may feel it more natural when the inverted two-wheeled vehicle turns in the direction opposite to the direction in which the rider inclines his/her body. To perform such a control, the signs of the turning commands are inverted to define $$\gamma = -\frac{d}{L} \qquad (12)$$

so that the left wheel angular velocity command $\theta'_L$ and the right wheel angular velocity command $\theta'_R$ are modified as shown in the following Expressions (13) and (14).

$$\theta'_L = \theta' - K_{py} \cdot \frac{L-d}{L} \cdot \gamma \qquad (13)$$
$$= \theta' - K_{py} \cdot \gamma - K_{py} \cdot \gamma^2$$

$$\theta'_R = \theta' + K_{py} \cdot \frac{L+d}{L} \cdot \gamma \qquad (14)$$
$$= \theta' + K_{py} \cdot \gamma - K_{py} \cdot \gamma^2$$

While the steps 721 and 722 on which the rider puts his/her right and left legs are arranged in the y-axis direction in the inverted two-wheeled vehicle 700 shown in FIG. 7, they may be arranged along the travelling direction (that is, along the x-axis direction). That is, when a structure in which the rider rides on the vehicle as if the rider is riding on a skateboard is employed, the control described using Expressions (12) to (14) may be preferable since it would further accord with the sense of the rider.

In the travelling apparatus described above, as described with reference to FIG. 4 and the like, the coefficient in which the centroid movement d contributes to the correction amount is defined to be d/L. However, the way in which the centroid movement d is reflected in the correction amount to calculate the correction amount may vary depending on the travelling apparatus, the state of the road, the forward velocity at the time, the rider's weight, the temperature of the surrounding environment or the like or may be dynamically changed based on the detection of a state change. The coefficient may be defined to be, for example, $d^2/L$ or may be expressed by a function in which other parameters are also included.

It should be noted that the execution sequence of each piece of processing of an operation, a procedure, a step, a stage and the like in the apparatus, the system, the program, and the method described in the embodiment stated above can be realized in a desired order unless "before something" and "prior to something" and the like are clearly specified or output of a previous process is used by a later process. Even if words such as "first", "next" and the like are used for convenience, it does not mean that it is indispensable to carry out steps in this order.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A travelling apparatus comprising:
   a riding part on which a rider rides;
   a first driving wheel configured to be attached to the riding part so that the first driving wheel is displaced in one side of the riding part, the first driving wheel being rotationally driven;
   a second driving wheel configured to be attached to the riding part so that the second driving wheel is displaced in another side of the riding part, the second driving wheel being rotationally driven independently from the first driving wheel;
   a receiving part configured to receive a turning instruction from the rider;
   an acquisition unit configured to acquire centroid information regarding the rider's centroid, the centroid information including a deviation amount d of the rider's centroid position in a y-direction; and
   a controller configured to add, when the receiving part receives the turning instruction, a first correction amount calculated based on the deviation amount d acquired by the acquisition unit and the turning instruction to a first rotation amount of the first driving wheel calculated to rotationally drive the first driving wheel and add a second correction amount calculated based on the deviation amount d acquired by the acquisition unit and the turning instruction to a second rotation amount of the second driving wheel calculated to rotationally drive the second driving wheel.

2. The travelling apparatus according to claim 1, wherein the controller decreases a rotation change amount of the second driving wheel by the second rotation amount using the second correction amount to increase a rotation change amount of the first driving wheel by the first rotation amount using the first correction amount and decreases the rotation change amount of the first driving wheel by the first rotation amount using the first correction amount to increase the rotation change amount of the second driving wheel by the second rotation amount using the second correction amount.

3. The travelling apparatus according to claim 1, wherein:
   the riding part comprises a step part on which the rider stands and rides; and
   the acquisition unit comprises a first detection unit and a second detection unit provided in the step part, the first detection unit detecting a load by a left leg of the rider, the second detection unit detecting a load by a right leg of the rider, the acquisition unit acquiring the centroid information based on results of the detection by the first detection unit and the second detection unit.

4. The travelling apparatus according to claim 1, wherein the controller calculates the first correction amount and the second correction amount based on a rate of the displacement of the centroid in the y-direction with respect to an interval between the first driving wheel and the second driving wheel.

5. The travelling apparatus according to claim 1, wherein the receiving part receives the centroid information acquired by the acquisition unit due to an operation of moving the centroid by the rider as the turning instruction.

6. A control method of a travelling apparatus, the travelling apparatus comprising
   a riding part on which a rider rides;
   a first driving wheel configured to be attached to the riding part so that the first driving wheel is displaced in one side of the riding part, the first driving wheel being rotationally driven; and
   a second driving wheel configured to be attached to the riding part so that the second driving wheel is displaced in another side of the riding part, the second driving wheel being rotationally driven independently from the first driving wheel, the control method comprising:
   receiving a turning instruction from the rider;
   acquiring centroid information regarding the rider's centroid, the centroid information including a deviation amount d of the rider's centroid position in a y-direction; and
   adding, when the turning instruction is received in the receiving step, a first correction amount calculated based on the deviation amount d acquired in the acquiring step and the turning instruction to a first rotation amount of the first driving wheel calculated to rotationally drive the first driving wheel and adding a second correction amount calculated based on the deviation amount d acquired in the acquiring step and the turning instruction to a second rotation amount of the second driving wheel calculated to rotationally drive the second driving wheel.

7. A storage medium that stores a control program of a travelling apparatus, the travelling apparatus comprising
a riding part on which a rider rides;
a first driving wheel configured to be attached to the riding part so that the first driving wheel is displaced in one side of the riding part, the first driving wheel being rotationally driven; and
a second driving wheel configured to be attached to the riding part so that the second driving wheel is displaced in another side of the riding part, the second driving wheel being rotationally driven independently from the first driving wheel, the travelling apparatus causing a computer to execute the following steps of:

receiving a turning instruction from the rider;

acquiring centroid information regarding the rider's centroid, the centroid information including a deviation amount d of the rider's centroid position in a y-direction; and adding, when the turning instruction is received in the receiving step, a first correction amount calculated based on the deviation amount d acquired in the acquiring step and the turning instruction to a first rotation amount of the first driving wheel calculated to rotationally drive the first driving wheel and adding a second correction amount calculated based on the deviation amount d acquired in the acquiring step and the turning instruction to a second rotation amount of the second driving wheel calculated to rotationally drive the second driving wheel.

* * * * *